(12) United States Patent  (10) Patent No.: US 7,827,108 B2
Perlman et al.  (45) Date of Patent: Nov. 2, 2010

(54) SYSTEM AND METHOD OF VALIDATING A RELATIONSHIP BETWEEN A USER AND A USER ACCOUNT AT A FINANCIAL INSTITUTION

(75) Inventors: Jeffrey William Perlman, Lindfield (AU); Sofia Walsh, Wareemba (AU); Gregory Kenneth Storey, Caringbah (AU)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/275,397

(22) Filed: Nov. 21, 2008

(65) Prior Publication Data

US 2010/0131408 A1  May 27, 2010

(51) Int. Cl.
*G06Q 40/00* (2006.01)
(52) U.S. Cl. .............................. 705/44; 705/38; 705/39; 235/379
(58) Field of Classification Search ................... 705/35, 705/38; 379/100, 207
See application file for complete search history.

(56) References Cited

U.S. PATENT DOCUMENTS

| 3,652,795 | A | * | 3/1972 | Wolf et al. ............... 379/91.01 |
| 4,321,672 | A | * | 3/1982 | Braun et al. .................. 705/42 |
| 4,341,951 | A | * | 7/1982 | Benton ......................... 705/41 |
| 4,454,414 | A | * | 6/1984 | Benton ......................... 705/41 |
| 4,645,873 | A | * | 2/1987 | Chomet ................... 379/93.12 |
| 4,713,761 | A | * | 12/1987 | Sharpe et al. ................. 705/30 |
| 4,750,119 | A | * | 6/1988 | Cohen et al. ............. 705/14.34 |
| 4,823,264 | A | * | 4/1989 | Deming ........................ 705/39 |
| RE32,985 | E | * | 7/1989 | Nagata et al. ................. 705/41 |
| 4,866,611 | A | * | 9/1989 | Cree et al. ................... 708/112 |
| 4,941,090 | A | * | 7/1990 | McCarthy ................. 705/14.17 |
| 5,010,485 | A | * | 4/1991 | Bigari .......................... 705/17 |
| 5,025,372 | A | * | 6/1991 | Burton et al. ............. 705/14.17 |
| 5,132,521 | A | * | 7/1992 | Smith et al. .................. 235/382 |

(Continued)

FOREIGN PATENT DOCUMENTS

AU  640855  9/1993

(Continued)

OTHER PUBLICATIONS

Apr. 2003 Report of the Auditor General of Canada, Apr. 2003 Report-Chapter 2 (Post Pay).*

(Continued)

*Primary Examiner*—Ella Colbert
*Assistant Examiner*—Chika Ojiaku
(74) *Attorney, Agent, or Firm*—Jones Day

(57) ABSTRACT

A system and method for validating a relationship between a user and a user account at a financial institution includes a data communication device, a memory, a processor coupled to the memory, and an account validation module executable by the processor. The account validation module generates a verification identifier for storage in the memory and is provided to the user, and subsequently receives a user initiated financial transaction involving the user account at the financial institution. The received financial transaction includes a comparison identifier supplied by the user. The account validation module determines whether the comparison identifier corresponds to the verification identifier for purposes of validating the relationship between the user and the user account maintained at the financial institution.

37 Claims, 6 Drawing Sheets

U.S. PATENT DOCUMENTS

| | | | |
|---|---|---|---|
| 5,220,501 A * | 6/1993 | Lawlor et al. ................. 705/40 |
| 5,231,571 A * | 7/1993 | D'Agostino ................ 705/36 R |
| 5,326,960 A * | 7/1994 | Tannenbaum ............... 235/379 |
| 5,329,589 A * | 7/1994 | Fraser et al. ............. 379/91.02 |
| 5,350,906 A * | 9/1994 | Brody et al. ................ 235/379 |
| 5,351,296 A * | 9/1994 | Sullivan ...................... 705/70 |
| 5,383,113 A * | 1/1995 | Kight et al. ................... 705/40 |
| 5,412,730 A | 5/1995 | Jones |
| 5,440,634 A * | 8/1995 | Jones et al. ................... 705/67 |
| 5,453,601 A * | 9/1995 | Rosen ......................... 705/65 |
| 5,455,407 A * | 10/1995 | Rosen ......................... 705/69 |
| 5,557,516 A * | 9/1996 | Hogan ......................... 705/41 |
| 5,581,764 A * | 12/1996 | Fitzgerald et al. ........... 709/223 |
| 5,623,547 A * | 4/1997 | Jones et al. ................... 705/68 |
| 5,659,165 A * | 8/1997 | Jennings et al. ............. 235/379 |
| 5,692,132 A * | 11/1997 | Hogan ......................... 705/27 |
| 5,699,528 A * | 12/1997 | Hogan ......................... 705/40 |
| 5,745,574 A | 4/1998 | Muftic |
| 5,790,790 A | 8/1998 | Smith et al. |
| 5,793,302 A | 8/1998 | Stambler |
| 5,799,087 A * | 8/1998 | Rosen ......................... 705/69 |
| 5,815,657 A * | 9/1998 | Williams et al. ............. 705/1.1 |
| 5,832,463 A * | 11/1998 | Funk ........................... 705/35 |
| 5,850,442 A | 12/1998 | Muftic |
| 5,862,325 A | 1/1999 | Reed et al. |
| 5,873,072 A * | 2/1999 | Kight et al. ................... 705/40 |
| 5,884,288 A * | 3/1999 | Chang et al. ................. 705/40 |
| 5,884,312 A * | 3/1999 | Dustan et al. ...................... 1/1 |
| 5,890,140 A * | 3/1999 | Clark et al. ................... 705/35 |
| 5,893,120 A | 4/1999 | Nemes |
| 5,903,881 A * | 5/1999 | Schrader et al. .............. 705/42 |
| 5,920,629 A * | 7/1999 | Rosen ......................... 705/69 |
| 5,946,667 A * | 8/1999 | Tull et al. ................ 705/36 R |
| 5,953,423 A * | 9/1999 | Rosen ......................... 705/65 |
| 5,956,391 A * | 9/1999 | Melen et al. ........... 379/114.01 |
| 5,956,700 A * | 9/1999 | Landry ........................ 705/40 |
| 5,960,411 A | 9/1999 | Hartman et al. |
| 5,963,647 A * | 10/1999 | Downing et al. .............. 705/39 |
| 5,966,696 A * | 10/1999 | Giraud .................... 705/14.41 |
| 5,966,698 A * | 10/1999 | Pollin ......................... 705/34 |
| 5,974,148 A | 10/1999 | Stambler |
| 6,012,041 A * | 1/2000 | Brewer et al. ................ 705/28 |
| 6,012,044 A * | 1/2000 | Maggioncalda et al. ... 705/36 R |
| 6,012,045 A * | 1/2000 | Barzilai et al. ................ 705/37 |
| 6,012,048 A * | 1/2000 | Gustin et al. ................. 705/39 |
| 6,029,150 A | 2/2000 | Kravitz |
| 6,032,133 A * | 2/2000 | Hilt et al. ..................... 705/40 |
| 6,088,717 A | 7/2000 | Reed et al. |
| 6,092,053 A | 7/2000 | Boesch et al. |
| 6,173,272 B1 * | 1/2001 | Thomas et al. ................ 705/42 |
| 6,192,407 B1 | 2/2001 | Smith et al. |
| 6,227,447 B1 | 5/2001 | Campisano |
| 6,289,322 B1 * | 9/2001 | Kitchen et al. ............... 705/40 |
| 6,327,578 B1 | 12/2001 | Linehan |
| 6,330,550 B1 | 12/2001 | Brisebois et al. |
| 6,332,134 B1 | 12/2001 | Foster |
| 6,341,724 B2 | 1/2002 | Campisano |
| 6,351,739 B1 | 2/2002 | Egendorf |
| 6,360,205 B1 * | 3/2002 | Iyengar et al. ................. 705/5 |
| 6,424,249 B1 * | 7/2002 | Houvener ................ 340/5.82 |
| 6,467,684 B2 | 10/2002 | Fite et al. |
| 6,487,599 B1 | 11/2002 | Smith et al. |
| 6,547,129 B2 | 4/2003 | Nichols et al. |
| 6,609,113 B1 * | 8/2003 | O'Leary et al. ............... 705/39 |
| 6,748,367 B1 * | 6/2004 | Lee .............................. 705/66 |
| 6,757,710 B2 | 6/2004 | Reed |
| 6,871,288 B2 * | 3/2005 | Russikoff ..................... 726/19 |
| 6,932,268 B1 | 8/2005 | McCoy et al. |
| 6,963,843 B1 | 11/2005 | Takatsu et al. |
| 7,006,993 B1 | 2/2006 | Cheong et al. |
| 7,089,208 B1 | 8/2006 | Levchin et al. |
| 7,099,850 B1 | 8/2006 | Mann, II et al. |
| 7,103,571 B2 | 9/2006 | Shigemi et al. |
| 7,127,427 B1 | 10/2006 | Casper |
| 7,175,074 B2 * | 2/2007 | Mejias et al. ................ 235/379 |
| 7,177,838 B1 | 2/2007 | Ling |
| 7,231,372 B1 | 6/2007 | Prange et al. |
| 7,249,097 B2 | 7/2007 | Hutchison et al. |
| 7,249,099 B2 | 7/2007 | Ling |
| 7,251,656 B2 | 7/2007 | Keown et al. |
| 7,324,972 B1 | 1/2008 | Oliver et al. |
| 7,328,189 B2 | 2/2008 | Ling |
| 7,337,144 B1 * | 2/2008 | Blinn et al. ................... 705/40 |
| 7,337,953 B2 * | 3/2008 | Sgambati et al. ............ 235/379 |
| 7,346,577 B1 | 3/2008 | Williams et al. |
| RE40,220 E | 4/2008 | Nichols et al. |
| 7,366,702 B2 * | 4/2008 | David .......................... 705/67 |
| 7,376,621 B1 | 5/2008 | Ling |
| 7,395,241 B1 * | 7/2008 | Cook et al. ................... 705/39 |
| 7,426,530 B1 * | 9/2008 | Rosko et al. ................ 709/201 |
| 7,437,327 B2 * | 10/2008 | Lam et al. ..................... 705/40 |
| 7,444,672 B2 * | 10/2008 | Ellmore ......................... 726/8 |
| 7,447,662 B2 * | 11/2008 | Gibson ......................... 705/75 |
| 7,458,507 B2 * | 12/2008 | Fillinger et al. ............. 235/379 |
| 7,461,028 B2 * | 12/2008 | Wronski, Jr. ................. 705/44 |
| 7,461,265 B2 * | 12/2008 | Ellmore ...................... 713/183 |
| 7,461,776 B2 * | 12/2008 | Steiger, Jr. .................. 235/379 |
| 7,463,946 B2 * | 12/2008 | Smith et al. ................. 700/221 |
| 7,471,818 B1 * | 12/2008 | Price et al. .................. 382/137 |
| 7,472,171 B2 * | 12/2008 | Miller et al. ................ 709/219 |
| 7,487,127 B2 * | 2/2009 | Weichert et al. .............. 705/40 |
| 7,496,952 B2 * | 2/2009 | Edwards et al. ................ 726/4 |
| 7,500,606 B2 * | 3/2009 | Park et al. ................... 235/380 |
| 7,502,833 B2 * | 3/2009 | Schaeck ..................... 709/217 |
| 7,512,552 B2 * | 3/2009 | Karas et al. ................... 705/26 |
| 7,519,560 B2 * | 4/2009 | Lam et al. ..................... 705/64 |
| 7,523,182 B2 * | 4/2009 | Godwin ...................... 709/223 |
| 7,533,064 B1 | 5/2009 | Boesch |
| 7,536,354 B1 * | 5/2009 | deGroeve et al. ............. 705/54 |
| 7,540,408 B2 * | 6/2009 | Levine et al. ............... 235/379 |
| 7,543,738 B1 * | 6/2009 | Saunders et al. ............ 235/380 |
| 7,546,272 B2 * | 6/2009 | Loy .............................. 705/40 |
| 7,546,275 B1 * | 6/2009 | Herzberg et al. .............. 705/50 |
| 7,548,988 B2 * | 6/2009 | Philyaw et al. ............. 709/231 |
| 7,552,467 B2 * | 6/2009 | Lindsay ......................... 726/5 |
| 7,571,140 B2 * | 8/2009 | Weichert et al. .............. 705/40 |
| 7,577,599 B2 * | 8/2009 | Sanchez et al. ............... 705/35 |
| 7,580,857 B2 * | 8/2009 | VanFleet et al. .............. 705/14 |
| 7,581,257 B1 | 8/2009 | O'Hara |
| 7,590,595 B2 * | 9/2009 | Pessin ......................... 705/40 |
| 7,606,760 B2 | 10/2009 | Hutchison et al. |
| 7,680,679 B1 * | 3/2010 | Patricelli et al. ............... 705/2 |
| 7,694,135 B2 * | 4/2010 | Rowan et al. ............... 713/166 |
| 7,698,221 B2 * | 4/2010 | Blinn et al. ................... 705/41 |
| 7,702,580 B1 * | 4/2010 | Voth et al. .................... 705/40 |
| 7,707,105 B2 * | 4/2010 | O'Neil ......................... 705/39 |
| 7,729,925 B2 * | 6/2010 | Maritzen et al. ............. 705/1.1 |
| 2001/0039535 A1 | 11/2001 | Tsiounis et al. |
| 2002/0016769 A1 | 2/2002 | Barbara et al. |
| 2002/0052841 A1 * | 5/2002 | Guthrie et al. ................ 705/40 |
| 2002/0059141 A1 * | 5/2002 | Davies et al. ................. 705/42 |
| 2002/0073027 A1 * | 6/2002 | Hui et al. ...................... 705/40 |
| 2002/0083011 A1 * | 6/2002 | Kobayashi ..................... 705/64 |
| 2003/0074328 A1 * | 4/2003 | Schiff et al. ................... 705/75 |
| 2003/0097331 A1 * | 5/2003 | Cohen ......................... 705/39 |
| 2003/0101137 A1 | 5/2003 | Wronski, Jr. |
| 2003/0110136 A1 * | 6/2003 | Wells et al. ................... 705/64 |
| 2003/0183689 A1 * | 10/2003 | Swift et al. ................. 235/380 |
| 2003/0233334 A1 * | 12/2003 | Smith ........................... 705/75 |
| 2004/0103057 A1 * | 5/2004 | Melbert et al. ................ 705/38 |
| 2004/0118914 A1 * | 6/2004 | Smith et al. ................. 235/380 |
| 2004/0122770 A1 | 6/2004 | Craig et al. |
| 2004/0128508 A1 * | 7/2004 | Wheeler et al. ............. 713/170 |
| 2004/0236692 A1 * | 11/2004 | Sellen et al. ................... 705/45 |

| | | | |
|---|---|---|---|
| 2005/0086169 A1* | 4/2005 | Wells et al. | 705/44 |
| 2005/0097049 A1* | 5/2005 | Writer et al. | 705/44 |
| 2005/0131816 A1* | 6/2005 | Britto et al. | 705/39 |
| 2005/0147225 A1 | 7/2005 | Mallick et al. | |
| 2005/0199709 A1* | 9/2005 | Linlor | 235/380 |
| 2005/0211763 A1* | 9/2005 | Sgambati et al. | 235/379 |
| 2006/0131390 A1* | 6/2006 | Kim | 235/380 |
| 2006/0143122 A1* | 6/2006 | Sines et al. | 705/40 |
| 2006/0190300 A1* | 8/2006 | Drucker | 705/2 |
| 2006/0294005 A1 | 12/2006 | Drepak | |
| 2007/0260536 A1* | 11/2007 | Stone | 705/39 |
| 2007/0276944 A1* | 11/2007 | Samovar et al. | 709/225 |
| 2007/0291741 A1* | 12/2007 | Hwang | 370/352 |
| 2008/0015985 A1* | 1/2008 | Abhari et al. | 705/42 |
| 2008/0162295 A1* | 7/2008 | Bedier | 705/26 |
| 2008/0201769 A1* | 8/2008 | Finn | 726/7 |
| 2008/0306877 A1* | 12/2008 | Mandeles et al. | 705/76 |
| 2009/0150265 A1* | 6/2009 | Keld | 705/30 |
| 2009/0157531 A1 | 6/2009 | Bui | |
| 2009/0171844 A1 | 7/2009 | Olliphant et al. | |
| 2009/0182674 A1 | 7/2009 | Patel et al. | |
| 2009/0182675 A1 | 7/2009 | Brody | |

FOREIGN PATENT DOCUMENTS

WO    9613814    5/1996

OTHER PUBLICATIONS

Posting Payments, http://msdn.microsoft.com/en-us/library/aa480428(v=MSDN.10).aspx, 1998 (MSDN).*

International Search Report dated Jan. 14, 2010 from PCT Application Serial No. PCT/US2009/063948 (2 pp.).

* cited by examiner

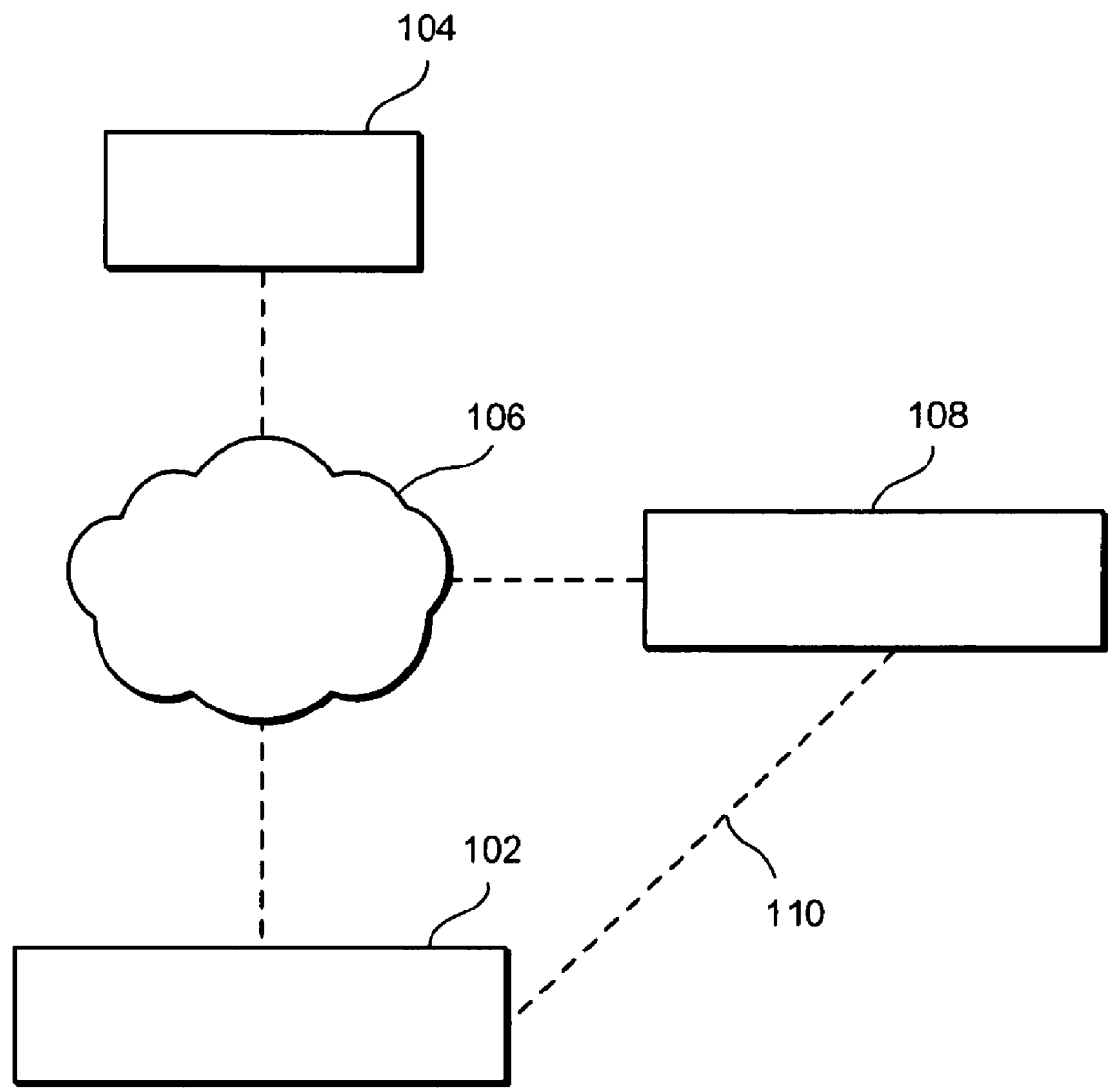
F I G. 1

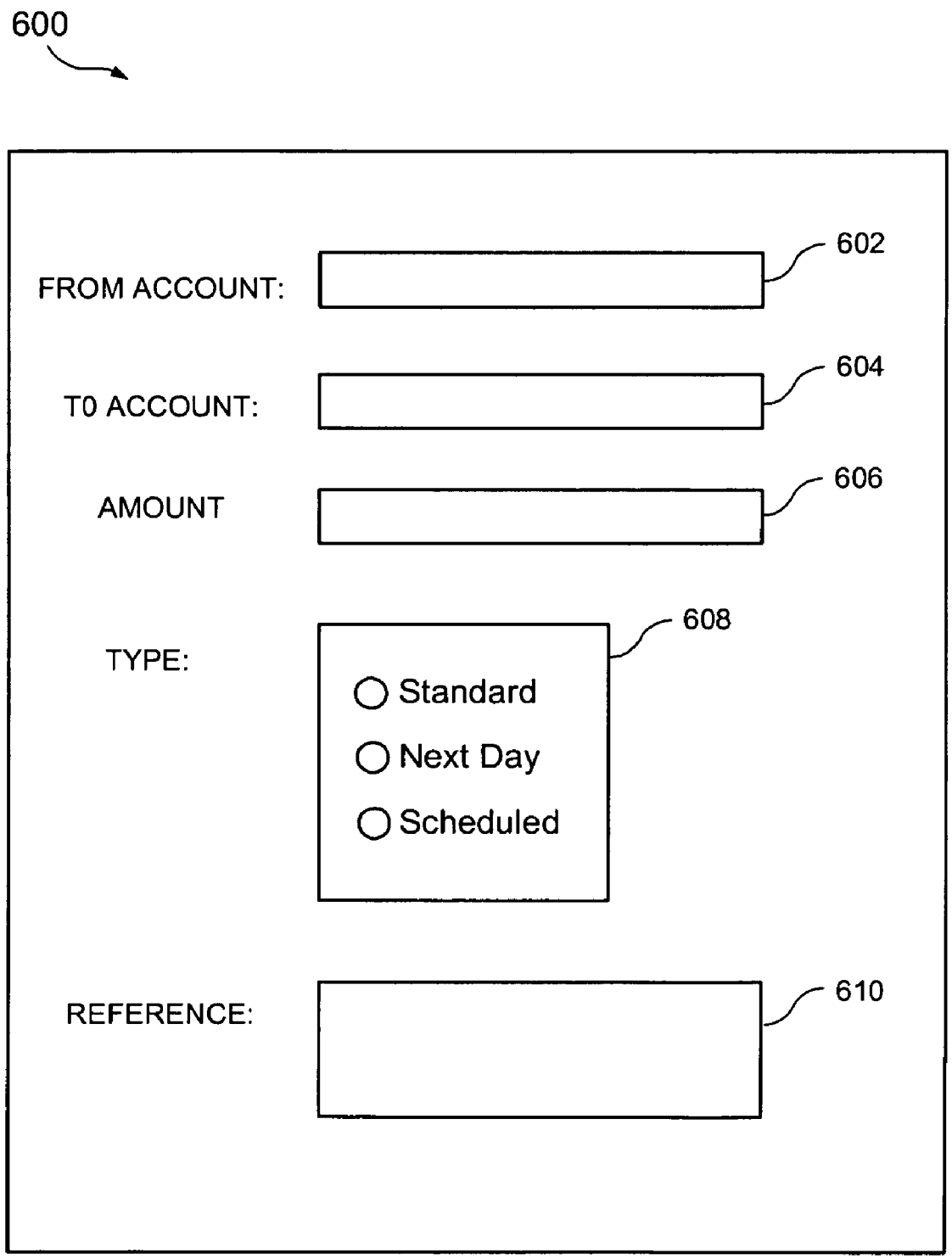
F I G. 6

SYSTEM AND METHOD OF VALIDATING A RELATIONSHIP BETWEEN A USER AND A USER ACCOUNT AT A FINANCIAL INSTITUTION

FIELD OF THE INVENTION

The present invention relates to data processing systems, and more particularly relates to a system and method of validating a relationship between a user and a user account at a financial institution.

BACKGROUND OF THE INVENTION

Internet-based payment service providers use payment systems (hereinafter referred to as 'payment systems' for the sake of brevity) that allow account holders (users) to transfer funds from accounts being maintained at their financial institutions, and perform financial transactions online with the transferred funds. For example, payment systems enable users to purchase goods and services online from the stored funds, and may also provide money market and brokerage services. However, as with other online services, there is the possibility of use of such user account for money laundering and other potentially illegal and unauthorized activity. Accordingly, it is important to implement security features that ensure that the transfer of funds to and from such accounts is legitimate, authorized, auditable and traceable.

Therefore, it would be desirable to provide a system and method of ensuring that a user account being maintained at a financial institution legitimately belongs to the user.

SUMMARY OF THE DISCLOSURE

In a first aspect, the present invention provides a system for validating a relationship between a user and a user account at a financial institution that includes a data communication device, a memory, a processor coupled to the memory, and an account validation module executable by the processor. The account validation module is adapted to generate a first verification identifier for storage in the memory, provide a second verification identifier corresponding to the first verification identifier to the user, receive a user initiated financial transaction involving the user account at the financial institution, the received financial transaction including a comparison identifier supplied by the user, and determine if the comparison identifier corresponds to the stored first verification identifier for purposes of validating the relationship between the user and the user account maintained at the financial institution.

In another aspect, the present invention provides a method of validating a relationship between a user and a user account at a financial institution that includes providing a verification identifier to a user, receiving a user initiated financial transaction involving the user account at the financial institution, the received financial transaction including a comparison identifier, and determining whether the received comparison identifier corresponds to the verification identifier provided to the user for purposes of validating the relationship between the user and the user account maintained at the financial institution.

In yet another aspect, the present invention provides a system for validating a relationship between a user and a user account at a financial institution that includes a data communication device, a memory, a processor coupled to the memory, and an account validation module executable by the processor. The account validation module is adapted to: (1) receive, from the user, user profile data containing a first account identifier of the user account, (2) generate a verification identifier, provide the verification identifier to the user, (3) receive a user initiated financial transaction involving the user account at the financial institution, the received financial transaction including a comparison identifier supplied by the user and a second account identifier, and (4) validate the relationship between the user and the user account maintained at the financial institution if the received comparison identifier corresponds to the generated verification identifier and the received second account identifier corresponds to the first account identifier contained in the received user profile data.

BRIEF DESCRIPTION OF THE DRAWINGS

FIG. 1 is a block diagram of an exemplary financial system in which the present invention may be employed.

FIG. 6 is an exemplary online banking transfer form according to an embodiment of the present invention.

DETAILED DESCRIPTION OF THE INVENTION

Figure 2:
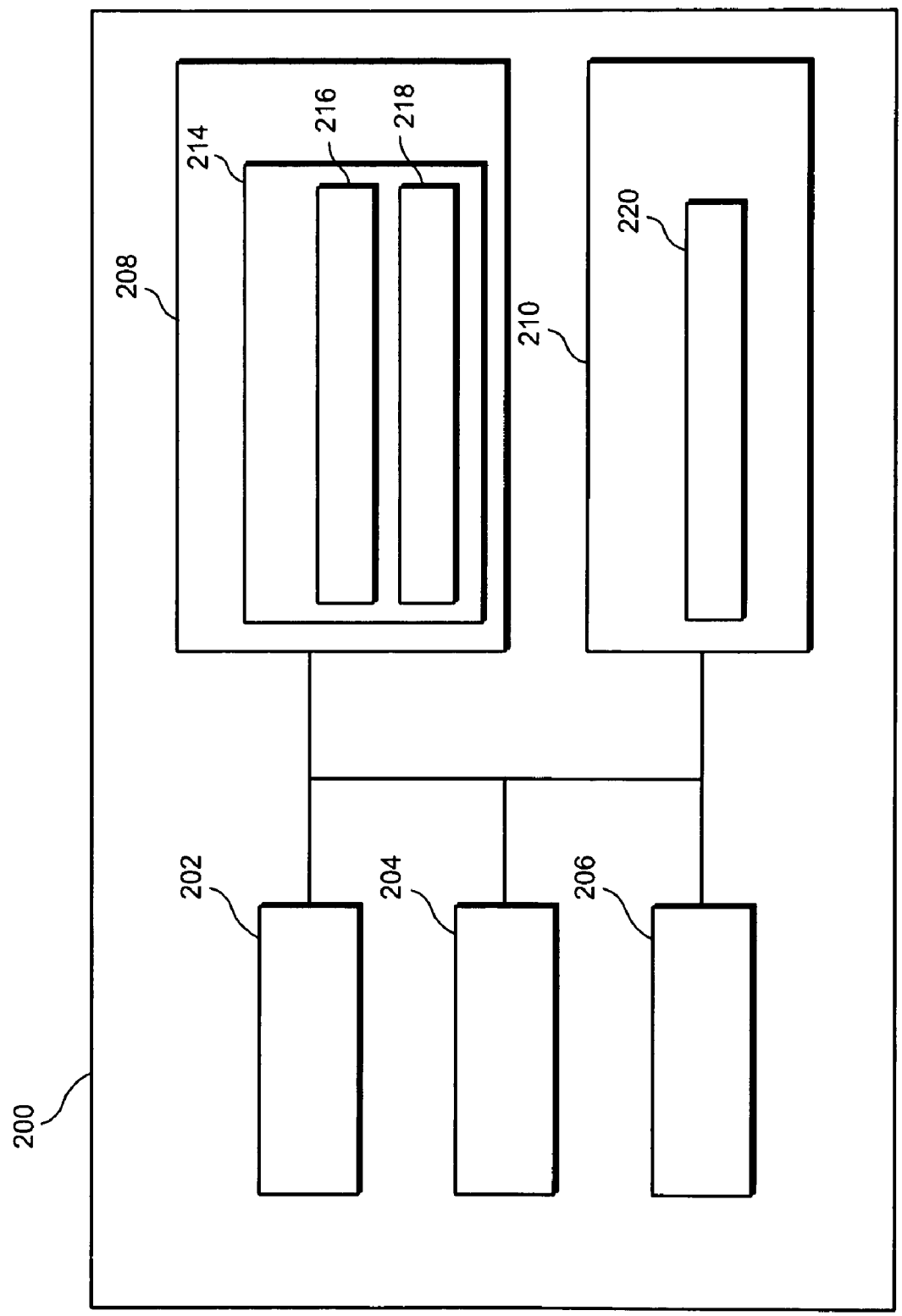
FIG. 2 is an exemplary computer employed by the payment system to enable validation of a user account at a financial institution according to an embodiment of the present invention.

According to the present invention, a user establishes an internal account with a payment service provider, providing user profile data to the payment system which the payment system stores in a user profile record to identify the account. The user profile record, which is maintained securely, includes information identifying an account at a financial institution (other than the payment system) that the user may employ to transfer funds to or from the payment service provider. The financial institution may be a bank, a credit card facility or any other institution at which the user maintains a financial account. For example, a user may have an account at XYZ bank; the user profile record will then include the routing information of the XYZ bank and the user's account number at the XYZ bank.

When the internal user account is established at the payment service, the payment system generates a unique verification identifier associated with the account, and then sends the verification identifier or a corresponding verification identifier to the user. To ensure that the user has control of the user account at the financial institution, the payment service requests the user to perform a financial transaction with the user account (e.g., transfer $50 from the financial institution to the internal account maintained at the payment service) by including the verification identifier in the transaction.

Subsequently, when a financial transaction is received from the financial institution attempting to transfer funds into the user's internal account, the payment system validates that the user has a pre-existing relationship with the financial institution as a security measure. Specifically, the user directs the financial institution to include the verification identifier it has received previously from the payment system with the transaction along with the user's account information at the financial institution. Upon receipt of financial transaction, the payment system uses the received identifier as an index to locate the user's profile record. The payment system then determines whether financial account information included in the financial transaction matches the financial information in the user's profile record, indicating that the user has a relationship with the financial institution. If the relationship is validated, the verification identifier is no longer required to be included in further financial transactions between the financial institution and the payment system. However, the verification identifier may be included in further financial transactions for purposes of revalidation or as a steering mechanism to direct deposits to the appropriate user account.

FIG. 1 is a block diagram of an exemplary financial system 100 in which the present invention may be employed. The system 100 includes a payment system 102 employed by a payment service provider, in which a user 104 may establish financial accounts that store funds and which may be used to pay for goods and services online in a convenient manner. The user 104 may be any individual or corporate entity seeking to establish and use an account in the payment system 102. The user 104 may be connected to the payment system 102 via the Internet 106 using any suitable wire or wireless communication link.

The user 104 maintains a financial account at a financial institution 108. The financial institution 108 may be a bank, credit card facility, money market account or any other institution which holds financial accounts. The user 104 has control over the financial account at the financial institution 108 and can direct the financial institution 108 to transfer funds from the financial account by various means (e.g., check, credit or debit card, wire instruction, online interface, etc.) in a financial transaction. The financial institution 108 may communicate the financial transaction to the payment system 102 via a secure link 110, which may be proprietary, using known communication methods. For example, if the financial institution 108 is a bank, the financial transaction may be implemented using a direct entry (DE) file communicated by direct inter-bank transfer or through intermediary entities such as the Automated Clearing House (ACH). To support online communications, the financial institution 108 may also be connected to the Internet 106.

It is to be appreciated that while the system 100 of FIG. 1 is depicted as having a single user 104 and a single financial institution 108, this depiction is merely illustrative, and system 100 typically includes a plurality of users, each of which may have accounts at one or more financial institutions.

Referring now to FIG. 2, an exemplary computer (e.g., server) 200 of the payment system 102 is shown. The computer 200 includes a communication device 202 adapted for data communication using a plurality of communication modes and protocols. The communication device 202 receives information from and sends information to the user 104 via the Internet 106 and from/to the financial institution 108 over link 110. The computer 200 also includes a processor (CPU) 204, memory storage 206, program storage 208, and data storage 210, all commonly connected to each other through a bus 212. The program storage 208 includes an account validation module 214 that further includes a user registration module 216 and a matching module 218. The user registration module 216 includes program code for establishing internal user accounts and may support a web-based interface with forms, dialog boxes, etc. that prompt the user to enter information to register with the payment system 102. The matching module 216 performs validation of user accounts at financial institutions. The data storage 210 stores a user profile records 220 for all internal user accounts of the payment system 102. The software program modules in the program storage 208 and data in the data storage 210 may be transferred to the memory 206 as needed for ready access by the processor 204.

It is to be appreciated that the computer 200 may comprise any computer such as a personal computer, minicomputer, workstation or mainframe, or a combination thereof. While the computer 200 is shown, for illustration purposes, as a single computer unit, the system may comprise a group/farm of computers which can be scaled depending on the processing load and database size.

Figure 3:
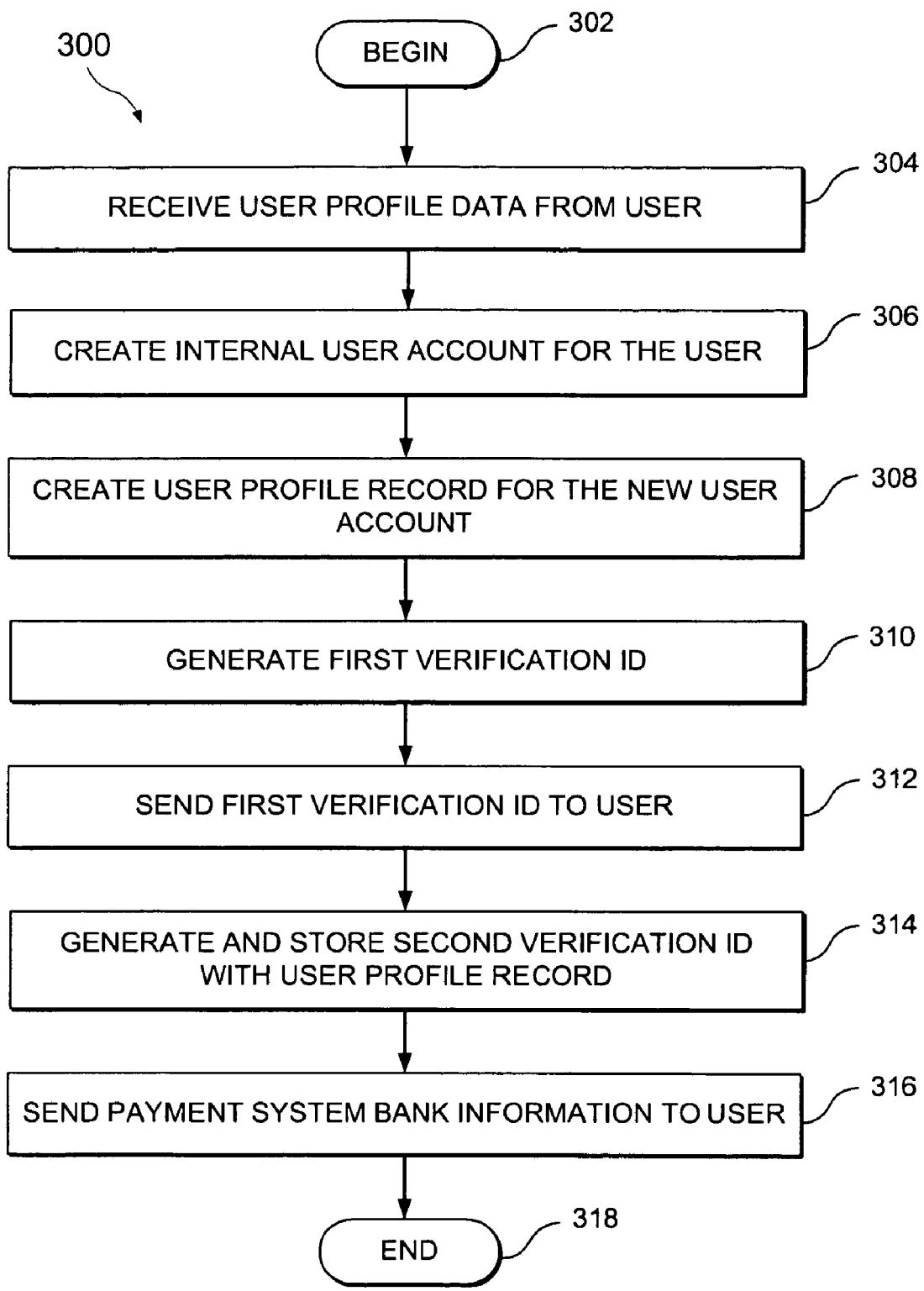
FIG. 3 is a flow chart of an exemplary process by which a user sets up an internal account with the payment system according to an embodiment of the present invention.

FIG. 3 is a flow chart of an exemplary process 300 by which a user 104 sets up an internal account with the payment system 102 according to an embodiment of the present invention. In step 302, the method begins. The user registration module 216 of the payment system 102 may support a web interface (not shown) having a registration form that prompts the user 104 to enter personal information (user profile data). In step 304, the user registration module 216 receives the user profile data entered into the web interface. In step 306, the user registration module 216 creates an internal account for the user 104 with a unique account identifier, such as an account number. In some embodiments, to keep the unique account identifier secure, the account identifier is not provided to the user and is kept inaccessible from the user 104 even when the user accesses his or her account at the payment system 102. This security measure reduces the possibility of identity theft and unauthorized access to the user's account.

Figure 4:
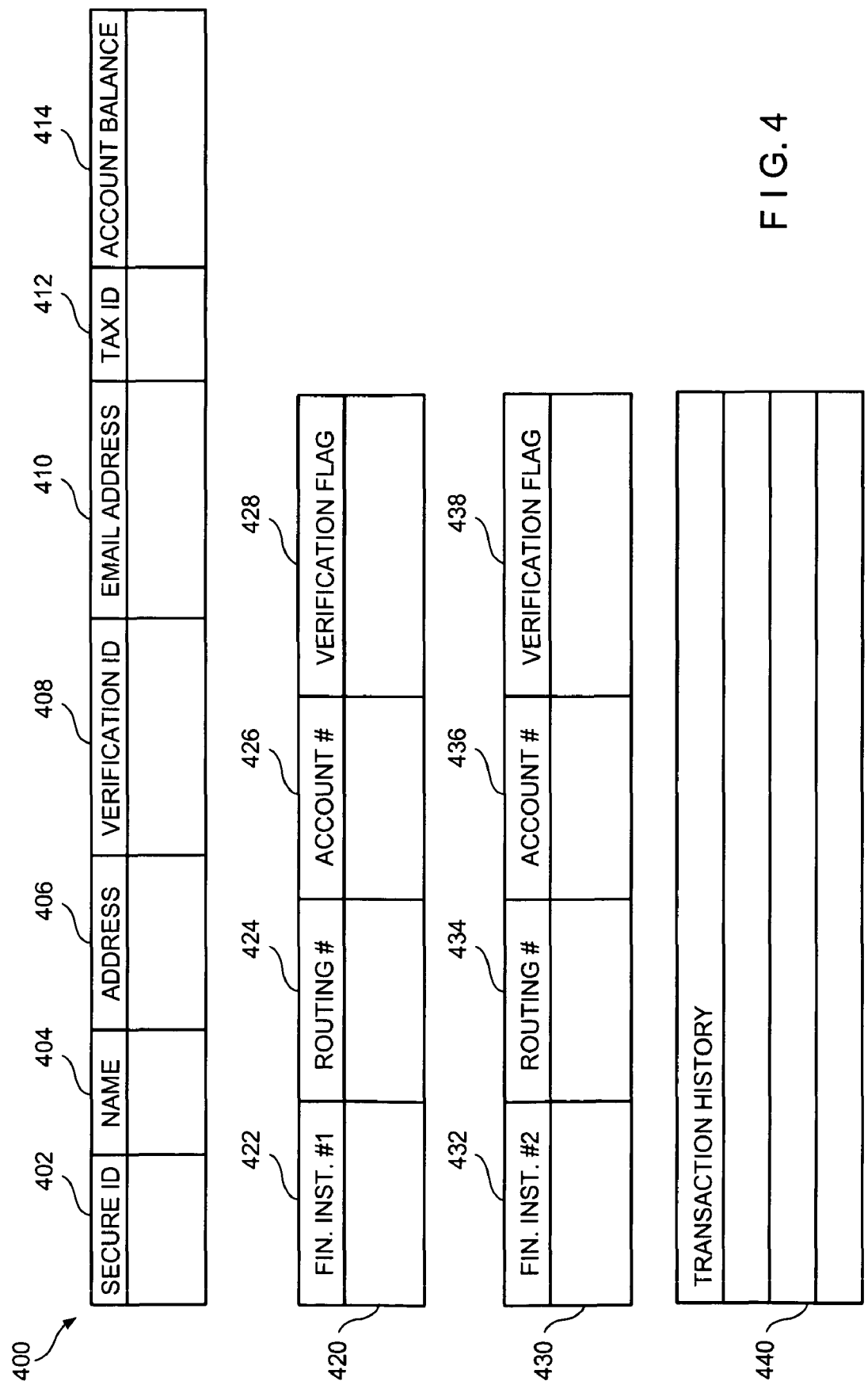
FIG. 4 is a schematic diagram of an exemplary user profile record according to an embodiment of the present invention.

In a following step 308, the user registration module 216 creates a user profile record associated with the new internal account (i.e., with the new unique account number) to store the received user profile data. The user profile record 400 may be stored as part of a database 220 of user profile records. An exemplary user profile record 400 according to an embodiment of the present invention is shown in FIG. 4. The exemplary user profile record 400 includes personal information 402 such as a secure ID 402, the user's name 404, address 406, verification identifier (explained below) 408, email address 410, tax ID 412, and account balance 414. In addition, the user profile record 400 includes financial account information 420, 430 for two financial institutions (financial institution #1, financial institution #2) at which the user maintains financial accounts. The financial account information 420 includes the name of financial institution 422, the routing number of the institution 424, the user's account number at the institution 426 and a verification flag 428 indicating whether the user's relationship with financial institution #1 has been verified. Financial account information 430 includes similar name 432, routing 434, account 436, and verification flag 438 information with respect to financial institution #2. The user profile record 400 may also include a transaction history 440 containing a list of transactions the user has performed using the payment system 102. The user profile record 400 may also include any other user information deemed appropriate.

Referring again to FIG. 3, the user registration module 216 receives the personal information 402 and financial account information of at least one of the financial institutions 420, 430 in step 308. In step 310, the user registration module 216 generates a unique verification identifier to be associated with the user profile record 400 (internal user account). In some embodiments, the verification identifier is a number or alphanumeric string of less than 16 digits or characters. The verification identifier may be partially or fully based on user information supplied by the user. For example, the identifier can be based on the name of the user whose name character string is converted into a number and then truncated to an appropriate size. In step 312, the user registration module 216 sends the verification identifier to the user 104. In some embodiments, in a following step 314, the user registration module 216 generates a second verification identifier derived from the first verification identifier (e.g., by hashing) and stores the second verification identifier in the user profile record 400 rather than the first verification identifier that has been sent to the user 104 as an added security measure. According to this embodiment, the verification identifier held by the user 104 and the verification identifier stored in the user profile record 400 differ, so that the verification identifier given to the user 104 is not directly accessible to personnel of the payment system 102.

In step 316, the user registration module 216 sends payee bank information of the payment system 102 to the user 104 (i.e., the account information of the payment system at a bank), enabling the user 104 to direct a money transfer from the user's financial institution 108 to the bank account of the payment system 102 and thereby to the internal user account at the payment system 102.

Figure 5:
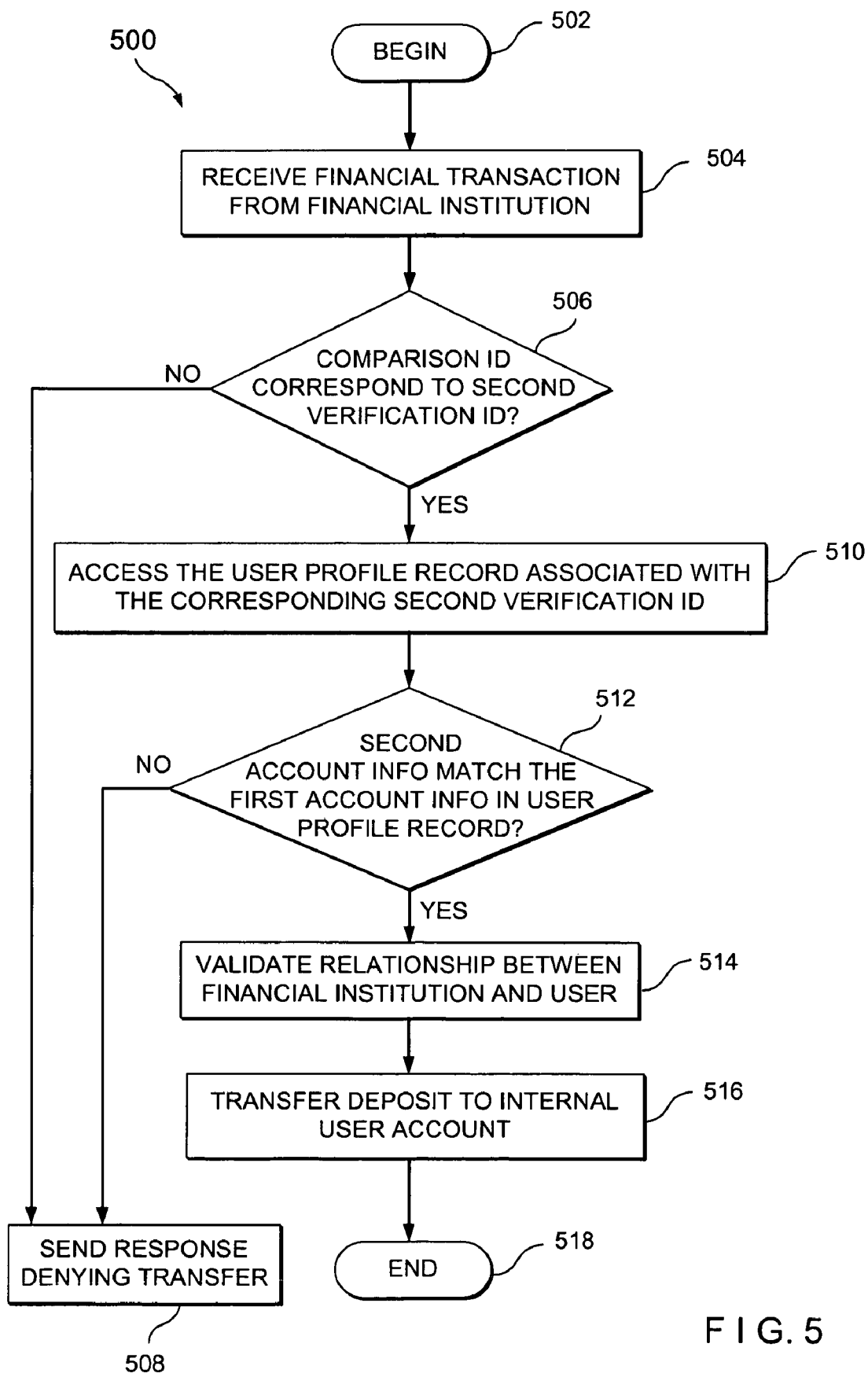
FIG. 5 is a flow chart of an exemplary method of validating a user account at a financial institution according to an embodiment of the present invention.

FIG. 5 is a flow chart of an exemplary method 500 of validating a user account at a financial institution according to an embodiment of the present invention. In step 502, the method begins. In step 504, a matching module 218 of the payment system receives a financial transaction notification (denoted simply as 'financial transaction' herein) from the financial institution 108 as directed by the user 104. FIG. 6 is an exemplary online banking transfer form 600 which the user may employ to transfer funds from the financial institution 108 to the user's account at the payment system 102. As indicated, the form 600 includes text input boxes for entering: the financial account information of the sending institution (From Account) 602, the financial account information of the payment system 604, the amount of the transfer 606, and reference information 610 as well as a selection box for the type of transfer 608. According to an embodiment of the present invention, the user 104 enters the verification identifier previously received from the payment system 102 in the reference information box 610. The information entered into form 610 is first delivered to the financial institution 108, which reformats the information into a financial transaction notification according to known inter-bank transfer protocols. For example, the financial institution 108 may incorporate the financial transaction in a direct entry (DE) file. Importantly, DE files may have fields and/or spaces in which the reference information 610 entered into the form 600, i.e., the verification identifier, may be entered. Since the matching module 218 tests the verification identifier included in the financial transaction, it is referred to as the 'comparison' identifier in the description below. Similarly, financial account information 602, 604, 606 is denoted as 'second' financial account information. The financial institution 108 sends the financial transaction to the payment system's account at the payee bank (not shown), which then passes the financial transaction to the matching module 218 of the payment system 102.

After the matching module 218 receives the financial transaction, in step 506, the matching module 218 queries the user profile records 220 for a corresponding verification identifier, for example, by performing the same hash used to derive the stored verification identifier on the comparison identifier and then comparing the hashed result with the stored verification identifier in the user profile record 400. It is noted that in embodiments in which the verification identifier that is sent to the user 104 and the stored verification identifier are the same, that a hashing process is not performed. If the user 104 has not registered with the payment system 102, in step 508, the matching module 218 causes a message indicating a denial of the transfer to the financial institution 108. After step 508, the method ends in step 518. If it is determined in step 506 that the user 104 has registered with the payment system 102, the comparison identifier will correspond to the stored verification in the user profile record database, and, in step 510 the corresponding user profile record is returned as the output of the query. In step 512, the matching module 218 then determines whether the second financial account information included in the financial transaction matches the first financial account information stored in the user profile record 400. More specifically, it is determined whether all items match, i.e., whether the first and second financial account information match exactly as to the name of the financial institution, the routing number, and the user account number. If the first and second financial account information match, in step 514, the matching module 218 validates the relationship between the user 104 and the financial institution 108 and the verification flag 438 in the user profile record 400 is set (e.g., to a check, "yes", etc.). In step 516, the matching module 218 transfers the deposit to the internal user account at the payment system 102, and updates the balance information in the user profile record 400, and then the method ends in step 518. If it is determined that the first and second financial account information do not match in step 512, the method branches to step 508, and the matching module 218 causes a transfer denial message to be sent to the financial institution 108.

Once the relationship between the user 104 and a financial institution 108 has been validated, further financial transactions sent from the financial institution 108 to the payment system 102 do not require a verification identifier to be included (however, as noted, the verification identifier may be included in further transactions for purposes of revalidation or as a steering mechanism); when a subsequent financial transaction from a financial institution 108 is received, the matching module 218 can query the user profile records 220 using the routing number and account number of the financial institution 108 and thereby determine that the verification flag 438 associated with the routing and account number has been set, indicating that the user/financial institution relationship has already been validated. In an alternative embodiment, the payment system 102 may initiate subsequent transactions as directed by the user and 'pull' transfers from validated financial institutions. Since both the user and the relationship of the user 104 to the financial institution 108 are trusted, pull transactions performed in this manner do not present significant security risks.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A payment service system for making electronic payments from a payment service account associated with a user, the payment service account being funded by financial transactions transferring money to the payment service account from a user account maintained at a financial institution, the payment service system comprising:
   a communication device;
   a memory;
   a processor coupled to the memory and communication device; and
   an account validation module executable by the processor and adapted to:
      store in the memory user account information received from a user, generate a verification identifier associated with the user account maintained at the financial institution, provide a first copy the verification identifier to the user, store a second copy of the verification identifier in the memory, receive, from the financial institution, a user initiated financial transaction involving the user account at the financial institution through the communication device, the received financial transaction including the first copy of the verification identifier, wherein the first copy of the verification identifier is supplied to the financial institution by the user for inclusion in the user initiated financial transaction, determine whether the first copy of the verification identifier contained in the received user initiated financial transaction corresponds to the second copy of the verification identifier stored in the memory, based on a successful determination that the received first copy of the verification identifier corresponds with the stored second copy of the verification identifier, store verification information in the memory to indicate that the relationship between the user and the user account has been successfully validated;

the account validation module further adapted to complete one or more subsequent user initiated financial transactions involving the user account at the financial institution based on the stored verification information without further validating the relationship between the user and the user account maintained at the financial institution.

2. The system according to claim 1, wherein the account validation module:

receives, from the user, user account information including first financial institution information concerning the financial institution maintaining the user account;

receives, from the user initiated financial transaction, second financial institution information concerning the financial institution involved in the financial transaction; and determines whether the first financial institution information matches the second financial institution information as part of the validation of the relationship between the user and the user account maintained at the financial institution.

3. The system according to claim 2, wherein each of the first and second financial institution information includes a routing number and an account number.

4. The system according to claim 2, wherein each of the first and second financial institution information further includes a routing number, an account number and a name of a financial institution.

5. The system according to claim 2, wherein the account validation module includes a user registration module adapted to:

receive user profile data from the user which includes the user account information; and create an internal user account for the user with the received user profile data.

6. The system according to claim 5, wherein the user registration module is further adapted to generate a secure account identifier associated with the internal user account, the secure account identifier being inaccessible to the user.

7. The system according to claim 6, wherein the financial transaction includes a deposit and the account validation module is adapted to transfer the deposit to the internal user account.

8. The system of claim 1, wherein the stored verification information is a verification flag that is set by the account validation module to indicate that the relationship between the user and the user account has been successfully validated.

9. The system of claim 1, wherein the stored second copy of the verification identifier is generated by hashing the verification identifier.

10. The system of claim 1, wherein the stored second copy of the verification identifier is an exact duplicate of the verification identifier.

11. A payment service system for making electronic payments from a payment service account associated with a user, the payment service account being funded by financial transactions transferring money to the payment service account from a user account maintained at a financial institution, the payment service system comprising:

a communication device;

a memory;

a processor coupled to the memory and the communication device; and an account validation module executable by the processor and adapted to store in the memory user profile data received from the user and containing an account identifier of the user account, the account validation module further adapted to generate a verification identifier, provide a first copy of the verification identifier to the user and store a second copy of the verification identifier in the memory, the account validation module further adapted to receive a user initiated financial transaction from the financial institution involving the user account at the financial institution through the communication device, the received financial transaction including the first copy of the verification identifier and a source account identifier, wherein the first copy of the verification identifier is supplied to the financial institution by the user for inclusion in the user initiated financial transaction, and store a verification information in the memory based on a successful determination that the received first copy of the verification identifier corresponds with the stored second copy of the verification identifier and the received source account identifier corresponds to the account identifier contained in the stored user profile data, the stored verification information indicating that the relationship between the user and the user account has been successfully validated;

the account validation module further adapted to complete one or more subsequent user initiated financial transactions involving the user account at the financial institution based on the stored verification information without further validating the relationship between the user and the user account maintained at the financial institution.

12. The system according to claim 11, wherein the account validation module requests the user to initiate the financial transaction at the financial institution with the first copy of the verification identifier.

13. The system according to claim 11, wherein after receiving the user initiated financial transaction, the account validation module:

retrieves the account identifier contained in the stored user profile data; and determines whether the retrieved account identifier matches the source account identifier contained in the user initiated financial transaction.

14. The system according to claim 11, wherein each of the account identifier in the stored user profile date and the source account identifier includes a routing number and an account number.

15. The system according to claim 14, wherein the account identifier in the stored user profile data further includes name of a financial institution.

16. The system according to claim 11, wherein the verification identifier includes an alphanumeric string.

17. The system according to claim 11, wherein the account validation module is adapted to create an internal user account associated with the user profile data.

18. The system according to claim 17, wherein the account validation module is adapted to generate a secure reference identifier associated with the internal user account, the secure reference identifier being inaccessible to the user.

19. The system of claim 17, wherein the financial transaction includes a deposit and the account validation module is adapted to transfer the deposit to the internal user account.

20. The system of claim 11, wherein the stored verification information is a verification flag that is set by the account validation module to indicate that the relationship between the user and the user account has been successfully validated.

21. The system of claim 11, wherein the stored second copy of the verification identifier is generated by hashing the verification identifier.

22. The system of claim 11, wherein the stored second copy of the verification identifier is an exact duplicate of the verification identifier.

23. A method of validating a relationship between a user and a user account maintained at a financial institution comprising:
generating a verification identifier at a payment system;
the payment system providing a first copy of the verification identifier to the user and storing a second copy of the verification identifier in a memory of the payment system;
receiving, at the payment system, a user initiated financial transaction involving the user account at the financial institution, the received financial transaction including the first copy of the verification identifier, wherein the first copy of the verification identifier is supplied to the financial institution by the user for inclusion in the user initiated financial transaction;
the payment system retrieving the second copy of the verification identifier from the memory;
the payment system determining whether the received first copy of the verification identifier corresponds to the retrieved second copy of the verification identifier for purposes of validating the relationship between the user and the user account maintained at the financial institution;
based on a successful determination that the received first copy of the verification identifier corresponds with the retrieved second copy of the verification identifier, the payment system storing verification information to indicate that the relationship between the user and the user account has been successfully validated;
receiving, at the payment system, one or more subsequent user initiated financial transactions involving the user account at the financial institution; and
completing the one or more subsequent user initiated financial transactions based on the stored verification information without further validating the relationship between the user and the user account maintained at the financial institution.

24. The method according to claim 23, wherein:
before the step of providing the first copy of the verification identifier to a user, the method further comprising receiving, from the user, user account information including first financial information concerning the financial institution maintaining the user account;
the received financial transaction includes second financial institution information concerning the financial institution involved in the financial transaction; and
the method further comprises determining by the processor whether the first financial institution information matches the second financial institution information.

25. The method according to claim 24, wherein each of the first and second financial institution information includes a routing number and an account number.

26. The method according to claim 25, wherein each of the first and second financial institution information further includes a name of a financial institution.

27. The method according to claim 24, further comprising:
receiving user profile data from the user, the user profile data including the user account information; and
creating an internal user account for the user associated with the user profile data.

28. The method according to claim 27, further comprising:
generating a secure account identifier for the internal user account; and
associating the secure account identifier with the user profile data;
wherein the secure account identifier is inaccessible to the user.

29. The method according to claim 27, wherein the financial transaction includes a deposit and the method further comprises transferring the deposit to the internal user account.

30. The method of claim 23, wherein the stored verification information is a verification flag that is set by the payment system to indicate that the relationship between the user and the user account has been successfully validated.

31. The method of claim 23, wherein the stored second copy of the verification identifier is generated by hashing the verification identifier.

32. The method of claim 23, wherein the stored second copy of the verification identifier is an exact duplicate of the verification identifier.

33. A method of validating a relationship between a user and a user account maintained at a financial institution, comprising:
storing user profile data in a memory of a payment system, the user profile data relating to an account of the user with the payment system;
storing financial account information in the memory of the payment system in association with the user profile data, the financial account information relating to the user account maintained at the financial institution;
the payment system generating a verification identifier;
the payment system sending a first copy of the verification identifier to the user and storing a second copy of the verification identifier in the memory in association with the user profile data;
receiving, at the payment system, a user initiated financial transaction involving the user account maintained at the financial institution, the received financial transaction including the first copy of the verification identifier and also including account information, wherein the first copy of the verification identifier is supplied to the financial institution by the user for inclusion in the user initiated financial transaction and the account information relates to the user account maintained at the financial institution;
the payment system matching the received first copy of the verification identifier with the stored second copy of the verification identifier in order to locate the user profile data in the memory and access the financial account information stored in association with the user profile data; and the payment system determining whether the stored financial account information corresponds to the account information received in the user initiated financial transaction in order to validate the relationship between the user and the user account maintained at the financial transaction.

34. The method of claim 33, further comprising:

storing verification information in the memory of the payment system in association with the user profile data based on a successful determination that the stored financial account information corresponds to the account information received in the user initiated financial transaction; and completing one or more subsequent user initiated financial transactions involving the user account maintained at the financial institution based on the stored verification information without further validating the relationship between the user and the user account maintained at the financial transaction.

35. The method of claim 33, wherein the stored verification information is a verification flag that is set by the payment system to indicate that the relationship between the user and the user account has been successfully validated.

36. A method of validating a relationship between a user and a user account maintained at a financial institution, comprising:

generating a verification identifier at a payment system, wherein a first copy of the verification identifier is provided to the user, and wherein a second copy of the verification identifier is stored at the payment system;

receiving a user initiated financial transaction at the payment system, wherein the financial transaction involves the user account and includes the first copy of the verification identifier;

validating the relationship between the user and the user account maintained at the financial institution, wherein validating occurs at the payment system, and wherein validating includes determining whether the first copy of the verification identifier included with the financial transaction corresponds to the stored second copy of the verification identifier;

generating and storing verification information indicating a successfully validated relationship, wherein the verification information is generated and stored at the payment system; and using the stored validation to complete subsequent user initiated financial transactions at the payment system, wherein subsequent financial transactions do not require relationship validation.

37. The method of claim 36, wherein the stored verification information is a verification flag that is set by the payment system to indicate that the relationship between the user and the user account has been successfully validated.

* * * * *